(12) United States Patent
White et al.

(10) Patent No.: US 11,349,319 B2
(45) Date of Patent: May 31, 2022

(54) LOW VOLTAGE CHARGING OF A HIGH VOLTAGE, SERIES-CONNECTED STRING OF BATTERY MODULES

(71) Applicant: Southwest Electronic Energy Corporation, Houston, TX (US)

(72) Inventors: David Allen White, Houston, TX (US); Brett Levins, Houston, TX (US); Jeffrey Johnson, Houston, TX (US)

(73) Assignee: Southwest Electronic Energy Corporation, Missouri City, TX (US)

( * ) Notice: Subject to any disclaimer, the term of this patent is extended or adjusted under 35 U.S.C. 154(b) by 120 days.

(21) Appl. No.: 16/843,356

(22) Filed: Apr. 8, 2020

(65) Prior Publication Data
US 2020/0303934 A1    Sep. 24, 2020

Related U.S. Application Data

(63) Continuation of application No. 14/942,888, filed on Nov. 16, 2015, now abandoned.

(60) Provisional application No. 62/083,786, filed on Nov. 24, 2014.

(51) Int. Cl.
*H02J 7/00* (2006.01)
*H01M 10/44* (2006.01)
*H01M 10/42* (2006.01)

(52) U.S. Cl.
CPC ......... *H02J 7/0016* (2013.01); *H01M 10/425* (2013.01); *H01M 10/441* (2013.01); *H02J 7/0014* (2013.01); *H02J 7/0019* (2013.01); *H02J 7/0021* (2013.01); *H02J 7/0047* (2013.01)

(58) Field of Classification Search
CPC ...... H02J 7/0016; H02J 7/0014; H02J 7/0047; H02J 7/0019; H01M 10/441; H01M 10/425
USPC .................................................. 320/121, 122
See application file for complete search history.

(56) References Cited

U.S. PATENT DOCUMENTS

| 3,928,791 | A | 12/1975 | Mullersman |
| 5,886,503 | A * | 3/1999 | McAndrews ......... H02J 7/0013 320/121 |
| 6,034,506 | A | 3/2000 | Hall |
| 7,609,031 | B2 | 10/2009 | Benckenstein et al. |
| 2007/0184339 | A1 | 8/2007 | Scheucher |
| 2010/0194339 | A1* | 8/2010 | Yang ..................... H02J 7/0016 320/116 |

(Continued)

*Primary Examiner* — Richard Isla
*Assistant Examiner* — Manuel Hernandez

(57) ABSTRACT

Systems and methods for performing low voltage charging of a high voltage, series-connected string of battery modules are disclosed. A battery pack system may include a plurality of battery cells, including one or more groups of battery cells coupled in parallel. A processor may be configured to select a sub-group of battery cells from a group of battery cells for charging separately from other battery cells of the selected group of battery cells. The group of battery cells may be reconfigured to allow charging of the sub-group of battery cells separate from the other battery cells. The sub-group of battery cells may be charged, and then the group of battery cells may be reconfigured to allow operation of the sub-group of battery cells with the other battery cells. During charging, the sub-group of battery cells may be unavailable but other battery cells may continue to discharge.

18 Claims, 5 Drawing Sheets

(56) References Cited

U.S. PATENT DOCUMENTS

| | | | |
|---|---|---|---|
| 2010/0277123 A1* | 11/2010 | Lim | H02J 7/0014 |
| | | | 320/116 |
| 2010/0295510 A1 | 11/2010 | Moussaoui et al. | |
| 2011/0057617 A1 | 3/2011 | Finberg et al. | |
| 2011/0127964 A1* | 6/2011 | Nishida | H01M 10/441 |
| | | | 320/118 |
| 2012/0086400 A1* | 4/2012 | White | H02J 7/0016 |
| | | | 320/118 |
| 2012/0319658 A1 | 12/2012 | White et al. | |
| 2013/0127423 A1 | 5/2013 | Liang et al. | |
| 2014/0009092 A1 | 1/2014 | Ma et al. | |
| 2014/0210419 A1* | 7/2014 | Kim | H02J 7/0063 |
| | | | 320/134 |
| 2016/0241054 A1* | 8/2016 | Matsumoto | H01M 10/34 |
| 2020/0028375 A1* | 1/2020 | Ono | H02J 7/0024 |

\* cited by examiner

LOW VOLTAGE CHARGING OF A HIGH VOLTAGE, SERIES-CONNECTED STRING OF BATTERY MODULES

CROSS REFERENCE TO RELATED APPLICATIONS

This application is a continuation of U.S. patent application Ser. No. 14/942,888 to David A. White et al. entitled "LOW VOLTAGE CHARGING AND BALANCING OF A HIGH VOLTAGE, SERIES-CONNECTED STRING OF BATTERY MODULES" and filed on Nov. 16, 2015, which claims priority under 35 U.S.C. § 119(e) to U.S. Provisional Patent Application No. 62/083,786 to David A. White et al. entitled "LOW VOLTAGE CHARGING OF A HIGH VOLTAGE, SERIES-CONNECTED STRING OF BATTERY MODULES" and filed on Nov. 24, 2014, both of which are hereby incorporated by reference in their entirety.

FIELD OF THE DISCLOSURE

The present disclosure generally relates to battery cells, charging battery cells, and systems that use battery cells. More specifically, the present disclosure is related to methods and systems for charging and balancing high voltage, series-connected strings of battery cells with low voltage power sources.

BACKGROUND

Multiple batteries may be series-connected to provide high voltage outputs for applications that require high voltages. Here, batteries generally refer to any power source including battery cells, battery packs, and battery modules. This allows devices to operate at higher voltages then those that would be allowed by a single battery. Traditionally, a high voltage string of series-connected batteries is charged with a power supply coupled to the ends of the string. The power supply outputs a voltage equal to or greater than the full charge voltage of the string. However, charging a high voltage series-connected string of batteries using conventional charging schemes and standard power supplies becomes increasingly difficult and expensive as the number of batteries in the series-connected string increases.

In particular, accuracy and precision of the voltages at nodes in the string are more difficult to control in high voltage charging applications because voltage variation at nodes can be linearly proportional to the charging voltage supplied by the power supply. For example, a power supply outputting 100 V with a variation of five percent yields node voltages in the string which may vary by 5 V. In contrast, a power supply outputting 800 V with the same variation of five percent yields node voltages which may vary by 40 V. In some scenarios, such a high voltage variation may be sufficient to cause the voltage at a node to exceed the maximum voltage that a component coupled to the node, such as a switch, can withstand. When a voltage across a component exceeds this maximum, the entire string of batteries can fail. In addition, such high voltage variation may cause some battery cells in the string to be overcharged while others are undercharged, causing either a failure or imbalance in the string. Further, when the battery cells are part of groups of battery cells in a battery pack module, and those battery pack modules are connected serially, an imbalance in a string can result in all of the battery cells of a module being over- or under-charged relative to other modules. Thus, conventional high voltage charging schemes are difficult to implement as they tend to require careful monitoring of the voltages at different nodes in a string, often by complex and expensive circuits, to avoid the issues that are exacerbated as string voltages increase.

SUMMARY

The charging of a high voltage string of series-connected battery cells may be improved by sub-dividing the battery cells in the string into smaller sub-strings and then charging the sub-strings using a lower voltage charge source (power supply) than would conventionally be coupled to the string. To further improve the charging process, the battery cells in the string may undergo a balancing process while the sub-strings are being charged, before the sub-strings are charged, or after the sub-strings are charged.

According to one embodiment, a method for low voltage charging of a high voltage, series-connected string of battery modules may include selecting a sub-group of battery cells from a group of battery cells for charging separately from other battery cells of the group of battery cells. The method may also include reconfiguring the group of battery cells to allow charging of the sub-group of battery cells separate from the other battery cells. The method may further include charging the sub-group of battery cells. The method may also include reconfiguring the group of battery cells to allow operation of the sub-group of battery cells with the other battery cells.

According to another embodiment, an apparatus for performing low voltage charging of a high voltage, series-connected string of battery modules may include a plurality of battery cells comprising one or more groups of battery cells coupled in parallel. The apparatus may also include a processor configured to perform the step of selecting a sub-group of battery cells from a group of battery cells for charging separately from other battery cells of the selected group of battery cells. The processor may also be configured to perform the step of reconfiguring the group of battery cells to allow charging of the sub-group of battery cells separate from the other battery cells. The processor may be further configured to perform the step of reconfiguring the group of battery cells to allow operation of the sub-group of battery cells with the other battery cells after the sub-group of battery cells have been charged. The apparatus may further include a power supply configured to charge the sub-group of battery cells when the group of battery cells have been reconfigured to allow charging of the sub-group of battery cells separate from the other battery cells.

Throughout this application, although "battery cells" may be referenced in describing systems and methods, the described functionality and systems may also be implemented on "battery pack system modules" (or "battery module" for short) in a similar manner. For example, each of the "battery cells" illustrated in the figures can also be "battery modules" where the battery module may include multiple cells connected in series or parallel or some combination of both series and parallel. The battery module, or battery cell, may also include other hardware for communicating, executing commands, enabling charge, enabling discharge, enabling bypass, balancing, measuring, reporting status, etc. For example, the battery module may include hardware as described in U.S. Pat. No. 7,609,031 and U.S. Patent Publication No. 2012/0319658, each of which is hereby incorporated by reference in their entirety.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiments disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

The charging of a high voltage string of series-connected battery cells may be improved by sub-dividing the number of battery cells in the string into smaller sub-strings and then charging the sub-strings using a lower voltage charge source (power supply). When charging of the sub-strings is complete, the sub-strings may be recombined to obtain a fully charged and balanced high-module-count string. In some embodiments, the charging function may be performed automatically within a battery pack system containing multiple parallel-connected high-module-count strings of autonomous battery modules without the loss of battery system high voltage and without the need for manual intervention or manual switching. In other words, the charging may be carried out automatically, without operator intervention, and without interrupting the power bus of a battery pack system containing multiple parallel-connected high-module-count series-connected strings. By not interrupting the power bus, one string in the battery pack system can undergo charging while the battery pack system supplies output voltage from the other strings in the battery pack system.

Figure 1:
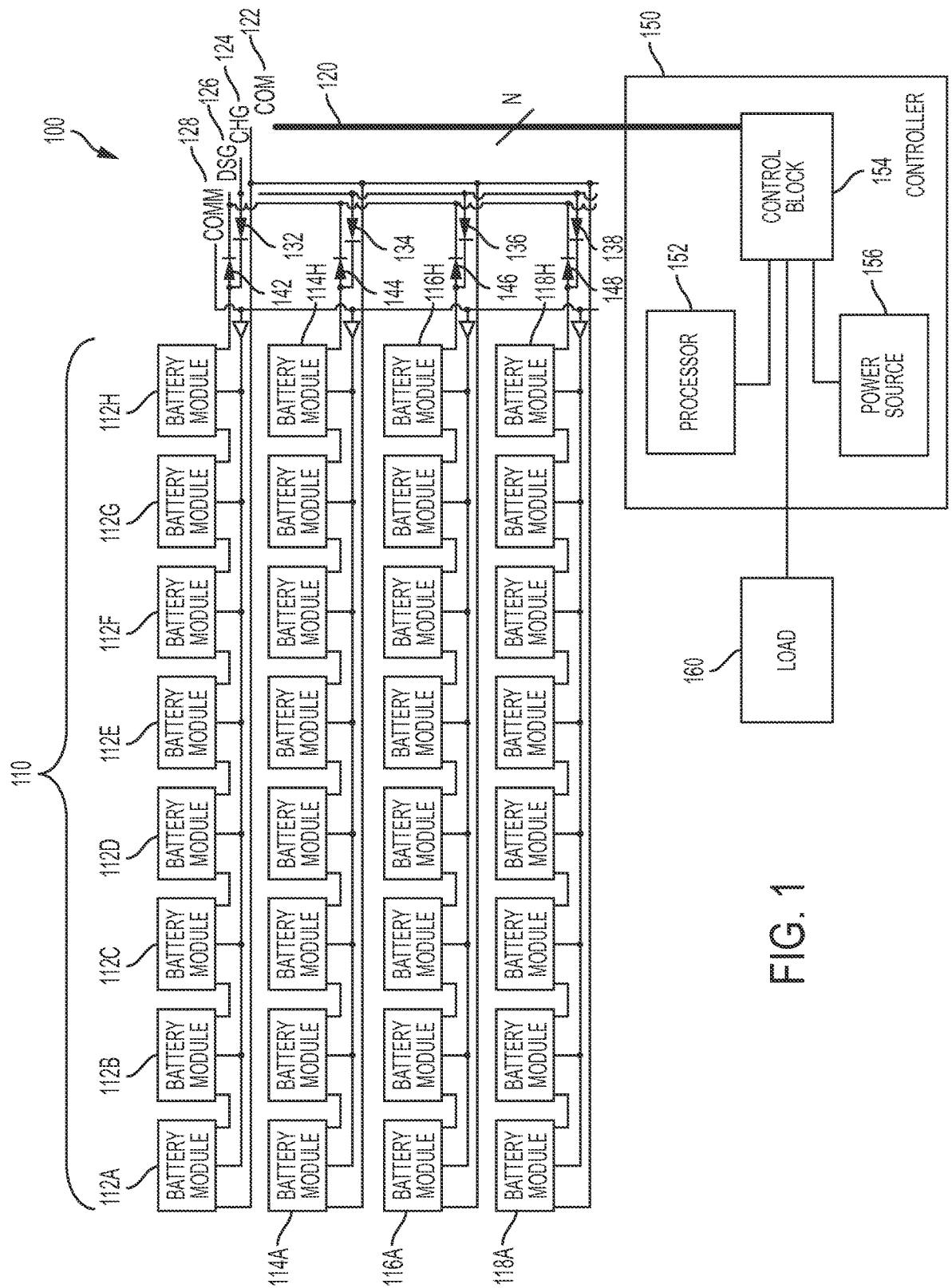
FIG. 1 is a block diagram illustrating a system for performing low voltage charging of a high voltage, series-connected string of battery modules according to one embodiment of the disclosure.

FIG. 1 is a block diagram illustrating a system for performing low voltage charging of a high voltage, series-connected string of battery modules according to one embodiment of the disclosure. In this disclosure, where "battery modules" and "battery cells" are discussed, they may be replaced with any rechargeable supply of energy including, but not limited to, batteries. System 100 includes a plurality of battery cells 110 that includes four groups of battery cells 112-118 coupled in parallel. As illustrated in FIG. 1, in this disclosure, a "group" of series-connected battery cells may refer to a "string" of series-connected battery cells. In addition, in this disclosure, the terms "couple" and "connect" are also used interchangeably. In some embodiments, a battery cell of the plurality of battery cells 110 may be a lithium-ion battery cell or any other battery cell technology, such as nickel metal hydride (NiMH), nickel cadmium (NiCad), Lithium polymer (LiPoly), alkaline, and/or lead acid.

Although only four groups, each having eight battery cells, are illustrated in FIG. 1, the plurality of battery cells 100 may include any number of groups of battery cells, each group having any number of battery cells. The choice of numbers and groups may vary to meet capacity, voltage, or other requirements. For example, to achieve a higher voltage, each group 112-118 may add more battery cells in series with the battery cells already in the string. To achieve a higher capacity, more groups of battery cells may be added in parallel with groups 112-118.

Each group of battery cells 112-118 may be coupled in parallel to a number of nodes on a bus 120. For example, each group 112-118 may be coupled to a common ground node (COM) 122 of the bus 120. Because each group consists of a number of series-connected battery cells, the common ground node 122 may be connected to only a single battery cell in a group. For example, in group 112, the common ground node 122 is coupled to the first battery cell in group 112, battery cell 112A.

Each group 112-118 may also be coupled to a charge node (CHG) 124 and/or a discharge node (DSG) 126 of the bus 120. For example, for charging, group 112 is coupled to the charge node 124 through a charge isolating diode 132, group 114 is coupled to the charge node 124 through charge isolating diode 134, group 116 is coupled to the charge node 124 through charge isolating diode 136, and group 118 is coupled to the charge node 124 through charge isolating diode 138. Because each group consists of a number of series-connected battery cells, the charge node 124 may be connected to only a single battery cell in a group. For example, in group 112, the charge node 124 is coupled to the last battery cell in group 112, battery cell 112H.

Likewise, for discharging, group 112 is coupled to the discharge node 126 through discharge isolating diode 142, group 114 is coupled to the discharge node 126 through discharge isolating diode 144, group 116 is coupled to the discharge node 126 through discharge isolating diode 136, and group 118 is coupled to the discharge node 126 through discharge isolating diode 138. Because each group consists of a number of series-connected battery cells, the discharge node 126 may be connected to only a single battery cell in a group. For example, in group 112, the discharge node 126 is coupled to the last battery cell in group 112, battery cell 112H.

An isolating diode may be a protective diode or an ideal diode circuit. The isolating diodes may be used to protect one string of battery cells from high voltages originating from another string. Whether a group is coupled to charge node 124 via a charge isolating diode or to the discharge node 126 via a discharge isolating diode may be controlled by one or more switches (not shown) that couple a group of battery cells to the charge node 124 through a charge isolating diode or to the discharge node 126 through a discharge isolating diode. In some embodiments, each group of battery cells 112-118 may be associated with a distinct number of separate switches.

Referring back to FIG. 1, each battery cell in the plurality of battery cells 110 is also coupled to a communication bus (COMM) 128 of bus 120. The communication bus 128 may be used to read information from one or more of the plurality of battery cells 110 or to control one or more of the plurality of battery cells 110. In some embodiments, the information which may be read from a battery cell via communication bus 128 may include at least the battery cell's open circuit voltage (OCV), relative OCV, impedance, current, coulomb count value, and gas gauge value, although the information about a battery cell which may be read or measured via communication bus 128 is not limited to the aforementioned information. For example, additional battery cell information which may be obtained may include a battery cell voltage, amp-hour capability, charge current capability, and/or capacity relative to other battery cells.

As shown in FIG. 1, the communication bus 128 may be coupled to each battery. For example, communication bus 128 connects to each battery cell 112A-112H, 114A-114H, 116A-116H, and 118A-118H. Accordingly, distinct information may be received for each battery cell. Similarly, each battery cell may be capable of receiving independent control instructions via communication bus 128, so as to be controlled independently from the other battery cells in the plurality of battery cells. However, in some embodiments, instead of each battery cell being controlled independently, a group of battery cells, such as one of groups 112, 114, 116, and 118, may be controlled as a group. In other embodiments, the battery cells may include their own control mechanisms, such as a battery management system, so that they can autonomously control themselves instead of being solely controlled via the communication bus 128.

The battery system 100 may also include a controller 150 for performing and controlling functions related to management of battery cells, battery modules, or battery pack systems. The controller 150 may include a processor 152, a control block 154, and a power source 156. The processor 152 may include one or more processors working in collaboration, such as, in parallel. The components illustrated in FIG. 1, with the exception of load 160, may be packaged together as a battery pack system. In other configurations, the controller 150 may be an external component that couples to a load 160 and to a battery pack system that includes battery cell groups 112-118, a bus for communicating to external components, and/or interconnecting components between the plurality of battery cells and the bus, such as switches and isolating diodes. In another embodiment, the controller 150 may be a control block within one battery cell of the group of battery cells. The power source 156 may be a power source external to the controller 150. That is, the controller 150 may include the processor 152 and control block 154, but not power source 156. Other combinations of packaging the equipment shown in FIG. 1 are also possible.

Controller 150 may be coupled to the plurality of battery cells 110 via bus 120. The controller may read information from one or more of the battery cells via communication bus 128 of bus 120. For example, the processor 152 may configure control block 154 to read information from one or more battery cells via communication bus 128. The processor 152 may subsequently process the information to determine individual needs for each battery cell compared to other battery cells in a string of battery cells or other battery cells in the plurality of battery cells 110. The processor 152 may then determine whether to issue specific control instructions for the one or more battery cells. For example, the processor 152 may issue an instruction to configure a battery cell into a charge, discharge, or bypass mode.

The power source 156 may be any kind of power supply for charging a battery cell. The power source 156 may be a constant voltage, constant current power supply. The power source 156 may also be a configurable source with multiple voltage ranges tailored to the size of a group currently configured to be charged from the power source. In particular, the power source 156 does not need to be an evenly divisible number of the total count of battery cells. The power source 156 may have an output determined by a lowest number of battery cells within a group.

The control block 154, isolating diodes 132-138 and 142-148, and switches (not shown) may be configured by the processor to couple the output of the power source 156 to a group of battery cells that requires charging. As an example, the processor 152, based on information retrieved from the plurality of battery cells via communication bus 128, may determine that a particular group, such as group 114, requires charging. Accordingly, processor 152 may configure the control block 154, isolating diodes 132-138 and 142-148, and switches (not shown) to couple the power source to group 114 via charge bus 124 to allow group 114 to be charged. The remainder of the groups of battery cells, such as groups 112, 116, and 118, may remain in a discharging configuration coupled to discharge node 126 to provide power to output load 160 via discharge bus 126. Accordingly, each group of battery cells may be controlled independently of one another, with at least one group of battery cells being charged, and the remainder of the groups of battery cells discharging to supply power to the load 160.

The controller 154 may also perform other functions in system 100 and include other components to perform those functions. For example, the controller 154 may include networking components allowing the controller 154 to communicate with and be controlled by a client device, such as client device 600 illustrated in FIG. 6, via a communication network.

In order to begin the charging process for a group of battery cells, the system may read information from the plurality of battery cells to determine which group or groups of battery cells is in most need of charging. For example, the processor 152 may read information via communication bus 128 from the plurality of battery cells 110 to identify a group (string) of battery cells in need of charge. In particular, the processor 152 may interrogate and record the relative capacity and voltage of each battery cell within a string, then repeat the same process for the other groups of battery cells to obtain the relative capacity and voltage of each battery cell within each string. In one calculation, the processor 152 may sum the individual voltages for each battery cell to determine the overall voltage for each battery cell and each group of battery cells. The processor 152 may then compare the total voltage for each group of battery cells to determine which group is in most need of charging, i.e., which group is at the lowest capacity or voltage. The processor 152 may also subsequently compare the voltage of the group in most need of charging to a pre-determined charge voltage threshold value. If voltage for a group of battery cells is below the threshold, the processor 152 may determine that the group of battery cells is in need of charging and initiate a charging process for the group of battery cells.

After determining which group of battery cells is in most need of charging, the processor 152 may calculate other parameters and make numerous decisions and determinations that affect the charging process. For example, the processor 152 may calculate the amount of charge needed to equalize the group with the lowest capacity or voltage to the group with the highest capacity or voltage. In addition, the processor 152 may determine if the difference in capacity or voltage can be equalized with a single charging event or if equalization may require multiple charging events. Further, the processor 152 may determine how much time is required for a single charge event to bring the group of battery cells with the lowest capacity or voltage within a capacity or voltage tolerance of the group with the next highest capacity or voltage or within a capacity or voltage tolerance of the group with the highest capacity or voltage. The processor 152 may also determine if a single charge event may make the group of battery cells the group with the highest capacity or voltage.

The processor 152 may also determine if the time needed to accomplish the charge event is acceptable for the application in which the plurality of battery cells are used. For example, a series group of battery cells will be removed from the discharging node to undergo charging, thus rendering it unable to provide current to the output load. Accordingly, the processor 152 may determine whether the application for which the batteries are being used can withstand a reduction in capacity from the plurality of battery cells or if the time duration for a charging event should be reduced because the application cannot withstand the reduction in capacity. That is, the remaining capacity of connected battery cells may be sufficient to only operate the load 160 for a short duration of time. Thus, the processor 152 may determine to disconnect and charge a subgroup of battery cells for that short duration of time.

After the processor 152 has identified a group of battery cells that is in need of charging, for example, because the voltage across the group of batteries cells is below a predetermined charge voltage threshold value, and after the processor 152 has calculated the other parameters and made the numerous determinations that affect the charging process, the processor 152 may initiate the charging process for the group of battery cells to be charged. To initiate the charging, the processor 152 may cause the control block 154 to isolate the group to be charged from the other groups of battery cells connected in parallel with the group to be charged. For example, referring to FIG. 1, the processor 152 may determine that group 116 is the group in most need of charging because it had the lowest total capacity and/or voltage. Accordingly, the processor 152 may cause group 116 to be isolated and/or disconnected from the discharge node 126 while keeping groups 112, 114, and 118 connected to the discharge node. With group 116 isolated from the other groups, the processor 152 may connect the group 116 to the charging node, for example, through control of the control block 154, isolating diodes, and switches. When the group 116 to be charged has been isolated from the discharge node and connected to the charging node, system 100 may begin the charging process illustrated in FIG. 2.

In another embodiment, isolating the group of battery cells selected for charging may also include lowering the discharge voltage of the group of battery cells selected for charging by commanding, by the processor 152, and via control block 154 and bus 120, all battery cells in the selected group to enter a bypass mode. As a result, the discharge voltage of the group of battery cells may drop to 0 V.

The system 100 as described above may provide new charging functionality by including a plurality of string isolators coupled to the processor 152, wherein each group of battery cells coupled in parallel is coupled to at least one string isolator. The plurality of string isolators may be configured to receive a signal from the processor 152 and, in response to reception of the signal, isolate a group of battery cells from other groups of battery cells to allow reconfiguration and charging of battery cells within the group of battery cells without interrupting a power bus coupled to the group of battery cells. Further, the configuration may allow charging of battery cells with a power source having a lower voltage than the maximum producible voltage from the system 100.

In view of systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein.

Figure 2:
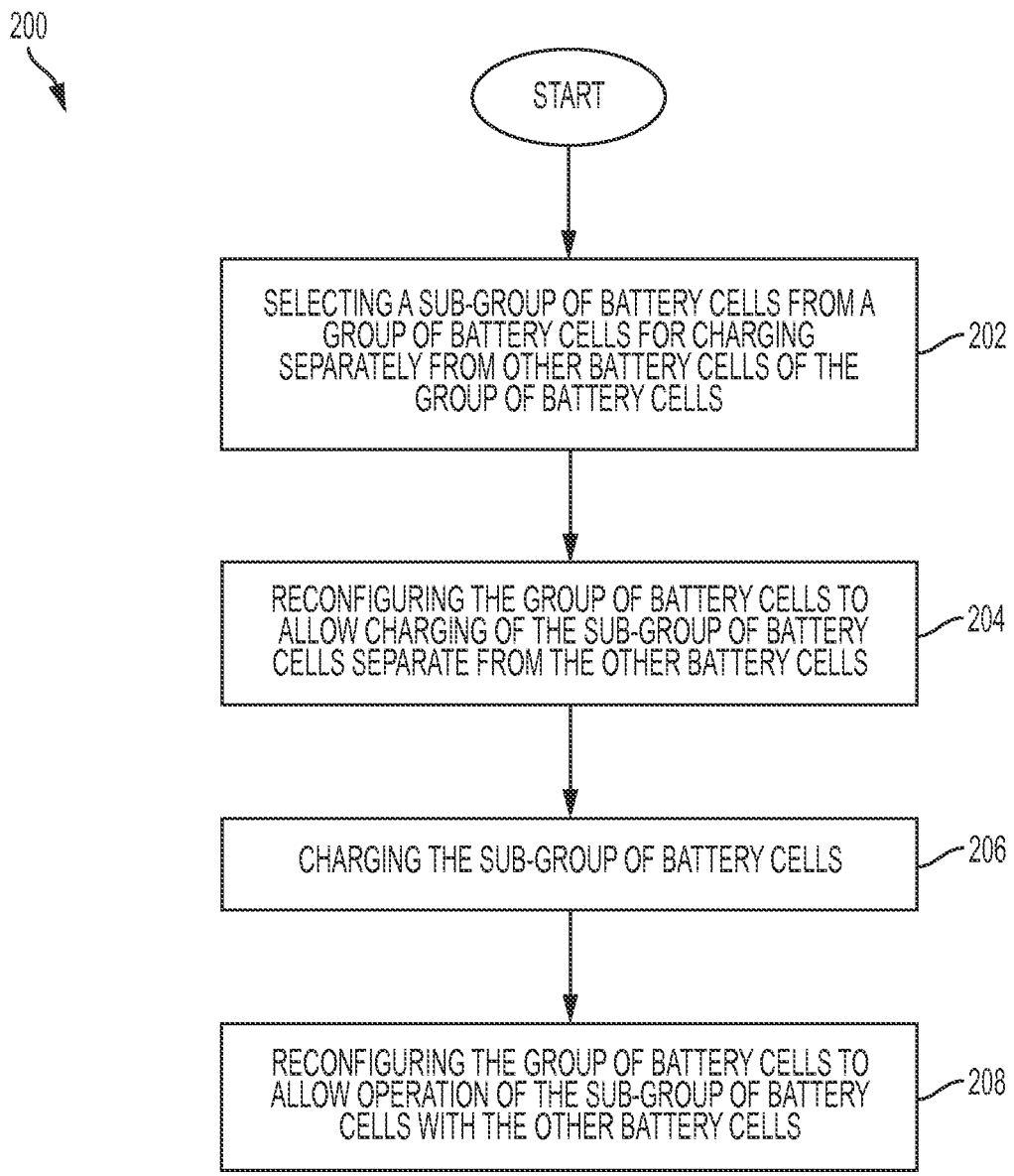
FIG. 2 is a flow chart illustrating a method for performing low voltage charging of a high voltage, series-connected string of battery cells according to one embodiment of the disclosure.

FIG. 2 is a flow chart illustrating a method for performing low voltage charging of a high voltage, series-connected string of battery cells according to one embodiment of the disclosure. Embodiments of method 200 may be implemented in accordance with the systems and embodiments described herein with respect to FIG. 1 and FIG. 6. For example, embodiments of method 200 may be implemented by system 100 and/or client device 600, such as by having the processor 152 execute code from a non-transitory computer readable medium to perform operations that carry out the steps of FIG. 2. In general, method 200 may be implemented by other similar systems without deviating from this disclosure so long as the systems, whether directly or indirectly, support the operations as described herein.

Specifically, method 200 includes, at block 202, selecting a sub-group of battery cells from a group of battery cells for charging separately from other battery cells of the group of battery cells. For example, with reference to FIG. 1, the processor 152 may read information about each battery cell in the plurality of battery cells 110 via the control block 154 and via the communication bus 128 of bus 120. Based on analysis of the information, the processor 152 may determine that group 114 is the group in most need of charging, for example, because the voltage across group 114 is the lowest of any group and is below a pre-determined charge voltage threshold value. To isolate the group and initiate the charging process, the processor 152 may, via communication bus 128, instruct the battery cells 114A-114H to enter a bypass mode. In addition, the processor 152 may cause the control block 154 and isolating diodes to disconnect group 114 from the discharge node 126 and to instead connect group 114 to the charge node 124.

In some embodiments, the processor 152 may determine, based on analysis of the information received about each battery cell, the battery cells in the group with the lowest charge. In addition, the processor 152 may determine, based on information about the power source available for charging and the maximum variability permitted by the application for which the plurality of batteries is used, the number of battery cells that can be charged at a time. For example, the processor 152 may determine that three battery cells should be charged at a time. However, in other embodiments, the processor 152 may determine that another number of battery cells should be charged at a time without departing from this disclosure in spirit or scope. In another example, the number of battery cells that make up a selected sub-group may be two or four or any other number battery cells. The choice of the number of battery cells to use as a sub-group to charge at a time may vary depending on the power supply available for charging and the determinations made by the processor 152.

At block 204, method 200 includes reconfiguring the group of battery cells to allow charging of the sub-group of battery cells separate from the other battery cells. For example, reconfiguring may include isolating the group to be charged from the other groups by instructing the battery cells not in the charge sub-group to enter a bypass mode, and instructing the battery cells in the sub-group to be charged to enter the charge mode while keeping the remaining groups in the bypass mode. The step of reconfiguring may also include instructing all of the battery cells in the group of battery cells to enter a bypass mode then instructing the sub-group of battery cells selected for charging to exit the bypass mode and enter a charge mode, allowing the selected sub-group of battery cells to be charged while the remainder of battery cells in the group of battery cells remain in a bypass mode.

More specifically, the step of reconfiguring may be executed according to commands from the processor 152 commanding the selected sub-group of battery cells to exit the bypass mode such that both a charge switch within each battery cell coupling the group to the charge node 124 and a discharge switch within each battery cell coupling the group to the discharge node 126 are "ON." Turning on both the discharge switch and the charge switch may avoid power loss by the charge FET not being turned on during discharge. The voltage of the group of battery cells may rise from 0 Volts to the sum of the voltages on each battery cell in the sub-group of battery cells. The resulting voltage may be smaller than the other groups of battery cells that are coupled to the discharge node and that have no battery cells bypassed. Thus, charge transferring from the other groups of battery cells coupled to the discharge node to the group of battery cells to be charged may be significantly limited because the discharge diode coupling the group of battery cells to be charged to the discharge node will be reverse biased. The reverse biasing significantly restricts transfer of charge from the other groups of battery cells to the group of battery cells to be charged. As a consequence of the reverse biasing of the discharge diode, charge transferring from the charge node 124, if it is of a lower voltage that is sized for charging the sub-group of cells, can transfer charge only into the sub-group of cells to be charged.

Figure 3:
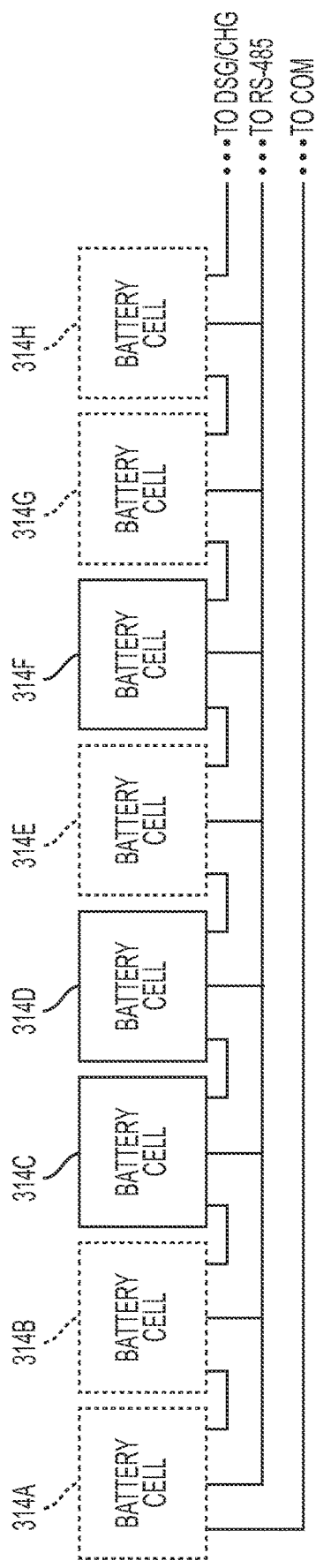
FIG. 3 is a block diagram illustrating the selection of a sub-group of battery cells for charging and the reconfiguring of the group to allow charging of the sub-group according to an embodiment of the disclosure.
Figure 4:
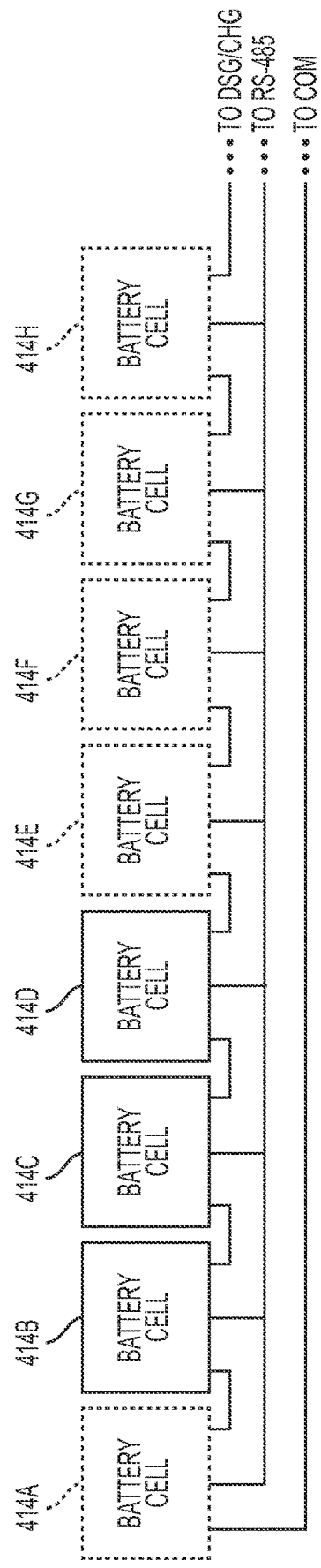
FIG. 4 is a block diagram illustrating the selection of a sub-group of battery cells for charging and the reconfiguring of the group to allow charging of the sub-group according to another embodiment of the disclosure.

As an illustration of the selecting and reconfiguring steps performed at blocks 202 and 204, respectively, FIGS. 3 and 4 provide block diagrams illustrating the selection of a sub-group of battery cells for charging and the reconfiguring of the group to allow charging of the sub-group separated from the other battery cells according to embodiments of the disclosure. FIG. 3 illustrates that any combination of battery cells may be selected for charging by the processor 152, such as when executing block 202 of FIG. 2. In particular, in the embodiment of FIG. 3, the processor 152 may have selected battery cells 314C, 314D, and 314F as the sub-group of group 114 for charging, because they were the battery cells with the least amount of charge based on information read from the battery cells through communication bus 128. Accordingly, the processor 152 may instruct the sub-group battery cells 314C, 314D, and 314F to exit a bypass mode that all the battery cells in the group, such as battery cells 314A-314H, were previously instructed to enter upon determination that the group was the group to be charged. Implementing the reconfiguration step illustrated at block 204 of FIG. 2 may also include, instructing the battery cells 314C, 314D, and 314F to enter a charge mode. Because reconfiguration may also include connecting a power source 156 to the charge node only, battery cells 314C, 314D, and 314F are the sub-group of battery cells in the charge mode while the remainder of battery cells 314A, 314B, 314E, 3140, and 314H remain in a bypass mode. Charging utilizing a power source 156 whose voltage is sized for charging a sub-group of 3 series connected battery cells may include charging of only the sub-group of battery cells 314C, 314D, and 314F that are selected for charging.

FIG. 4 illustrates another possible reconfiguration in which the battery cells selected by the processor 152 when executing block 202 for charging include consecutive battery cells. The remainder of the discussion of FIG. 3 is also applicable to the FIG. 4, with the exception being only that a different set of battery cells 414B, 414C, and 414D are selected as the sub-group for charging.

Returning to FIG. 2, at block 206, method 200 includes charging the sub-group of battery cells. The step of charging the sub-group of battery cells may include charging the sub-group of battery cells with a charge source having a voltage less than a full charge voltage of the group of battery cells. For example, with reference to FIG. 1, charging may include charging with power source 156. As noted in the discussions of blocks 202 and 204 and in the discussions of FIG. 3 and FIG. 4, the sub-group of battery cells selected for charging may include a sub-group of the battery cells in the group identified as most in need of charge. Because the power source need only charge the sub-group to full charge, the power source may charge the sub-group with a voltage less than a full charge voltage of the entire group of battery cells. As a specific example, each battery cell in the plurality of battery cells 110 may consist of a battery cell having a 36 Volt, 33 Amp-hour rating when fully charged. Thus, the full charge voltage for a group, such as group 114, may be approximately 288 V when each battery cell 114A-114H in the group is fully charged. To charge the entire high voltage, series-connected string of battery cells, the power source may need to supply at least 288 V. However, because only a sub-group of battery cells were selected at block 202, the power source may need to apply sufficient voltage to charge only the sub-group. For example, if the sub-group consists of the sub-group illustrated in FIG. 4, only three battery cells need be charged at a time. Thus, to charge the sub-group 112B-112D, the power source 156 may need to only supply at least 108 V. In other words, when all the battery cells in the other groups 114-118 are providing power to be discharged to a load, such as load 160, the group of battery cells may have a full charge voltage (e.g., 288 V) greater than the voltage used by the charge source power supply to charge the sub-group 112B-112D of battery cells (e.g., 108 V). Accordingly, charging of the sub-group may include charging the sub-group of battery cells with a charge source having a voltage less than a full charge voltage of the group of battery cells. In addition, because implementation of the reconfiguration step illustrated at block 204 results in only the sub-group being configured for charging while the remainder of battery cells in the group are maintained in a bypass mode, charging may include charging of the sub-group of battery cells separate from the other battery cells in the group.

At block 208, method 200 includes reconfiguring the group of battery cells to allow operation of the sub-group of battery cells with the other battery cells. For example, performing the step of reconfiguring illustrated at block 208 may include instructing, for example, by processor 152, the sub-group of battery cells to enter into a bypass mode so that all battery cells in the group are in a bypass mode and can be controlled as a group. The step of reconfiguring may also include instructing the control block 154 to configure the group for discharge by disconnecting the group from the charge node 124 and reconnecting the group to the discharge node 126. Reconfiguring may further include instructing the battery cells in the group which included the sub-group of battery cells that were charged to enter a discharge mode and a charge mode so that they can operate along with the other groups in the plurality of battery cells to efficiently provide power to be discharged to the load 160.

The reconfiguring and charging steps may be performed automatically without operator intervention. For example, the reconfiguring and charging steps may be controlled entirely by the processor 152 without operator intervention. Additionally, the reconfiguring and charging steps may be performed without interrupting a power bus coupled to the group of battery cells. For example, because the group of battery cells to be charged is isolated prior to reconfiguration of the group to allow for charging of a sub-group, the group of battery cells may be prevented from interrupting the discharge node due to its isolation from the discharge node. Thus, the reconfiguring and charging steps may be performed without interrupting the discharge node power bus coupled to the group.

Charging a sub-group of battery cells, such as at block 206, may include charging the sub-group for a pre-determined period of time and then repeating the charging process as needed before reconfiguring the group of battery cells to allow operation of the sub-group of battery cells with the other battery cells, such as at block 208. For example, after charging the sub-group for a pre-determined period of time, the processor may read information from the battery cells in the group to determine if the sub-group was sufficiently charged so as to raise the total charged voltage of the group above the pre-determined charged voltage threshold value. If the processor determines that charging the sub-group for the pre-determined period of time did not raise the total charged voltage of the group above the pre-determined charged voltage threshold value, the charging process may be repeated for the sub-group of battery cells. The re-reading or re-measuring of the total voltage of the group and the re-charging of the sub-group may be repeated until the total charged voltage of the group is determined to be above the pre-determined charged voltage threshold value. When the processor determines that the total charged voltage of the group is above the pre-determined charged voltage threshold value, the processor may proceed to implementation of the reconfiguration step illustrated at block 208 of FIG. 2.

Charging a sub-group of battery cells, such as at block 206, may alternatively include charging the sub-group for a period of time to reach a certain threshold that is actively being measured in a closed-loop feedback system, such as to obtain a pre-determined voltage threshold, a pre-determined capacity threshold, or a pre-determined current-draw threshold and then repeating the charging process for a different sub-group of battery cells until the total voltage charge of the group is determined to be above the pre-determined charged voltage threshold value. For example, after charging the sub-group for a pre-determined period of time, the processor may read information from the battery cells in the group to determine if the sub-group was sufficiently charged so as to raise the total charged voltage of the group above the pre-determined charged voltage threshold value. If the processor determines that charging the sub-group for the pre-determined period of time did not raise the total charged voltage of the group above the pre-determined charged voltage threshold value, the charging process may be repeated. However, before repeating the charging process the processor may read information from the battery cells in the group to determine which sub-group of battery cells within the group are in most need of charging, for example, which sub-group of battery cells have the lowest capacity or voltage. If the processor determines that the sub-group previously charged is still the sub-group in most need of charge, the processor may repeat the charging process for the sub-group. If the processor determines that a different sub-group should be charged, the processor may reconfigure the group of battery cells, such as by implementing the reconfiguration step illustrated at block 204, to allow charging of the new sub-group of battery cells separate from the other battery cells.

After each charging of a sub-group of battery cells for a pre-determined period of time, the processor may determine which sub-group should be charged in the subsequent charging of a sub-group of the group of battery cells. The process of charging a sub-group, determining if the new total charged voltage of the group has been raised enough so as to be above the pre-determined charged voltage threshold value, determining which sub-group should be charged in the subsequent charging of a sub-group of the group of battery cells, and/or re-charging a sub-group of the group of battery cells may be repeated until the total charged voltage of the group is determined to be above the pre-determined charged voltage threshold value. When the processor determines that the total charged voltage of the group is above the pre-determined charged voltage threshold value, the processor may proceed to implementation of the reconfiguration step illustrated at block 208 of FIG. 2.

After the processor has processed information received from the plurality of battery cells, the processor may determine that no group of battery cells is in need of charging. For example, after summing the individual voltages for each battery cell to determine the overall voltage for each battery cell and each group of battery cells and comparing the voltage for each group of battery cells, the processor may determine that no group of battery cells has a total voltage below a pre-determined charged voltage threshold value, and therefore that no group of battery cells requires charging. However, based on analysis of the information received from the plurality of battery cells, the processor may determine that one or more groups of battery cells requires balancing. That is, even though the plurality of battery cells may have been determined to not require charging, one or more groups may have been determined to require balancing.

The processor may determine that a group requires balancing through the use of a balancing window established for a group. For example, the processor may read information from battery cells in a group to determine the voltage across each battery cell in a group of battery cells. The processor may establish a balancing window for a group defined as the difference in voltage between the highest voltage of any battery cell in the group and a pre-determined lower value for the group. As an example, when the highest voltage a battery cell in a group can achieve is 36 V, the processor may set the lower threshold voltage for the window at 28 V. After reading the voltages of each battery cell in a group, the processor may determine that the highest voltage for any battery cell in the group may be 33 V, making the balancing window range from 28 V to 33 V. If all battery cells in the group have voltages within the balance window, the processor may determine that balancing is not required for the group. If, however, the processor determines that one or more battery cells in the group of battery cells has a voltage outside the balancing window, for example, below the lower threshold of the balancing window, the processor may determine that the group of battery cells requires balancing.

When the processor determines that a group of battery cells requires balancing, for example, because one or more battery cells in the group had voltages below the lower threshold of the balancing window for the group, the processor may initiate a balancing process for the group of battery cells. The balancing may include the processor selecting a sub-group of battery cells from the group of battery cells for balancing. The sub-group may include at least a battery cell having the lowest voltage of any battery cell in the group of battery cells. Because balancing a group of battery cells includes charging the lowest-charged battery cells until they are within the balancing window, balancing may also include implementation of actions illustrated in various blocks of method 200. For example, after selecting the sub-group of battery cells for balancing, the processor may reconfigure the group of battery cells to allow charging of the sub-group of battery cells separate from the other battery cells, such as is described at block 204, charge the sub-group of battery cells, such as is described at block 206, and then reconfigure the group of battery cells to allow operation of the sub-group of battery cells with the other battery cells, such as is described at block 208. As was the case with charging sub-groups in accordance with method 200, charging a sub-group of battery cells to balance a group of battery cells may be implemented in pre-determined time intervals, wherein after each interval the processor makes another determination as to whether the group still needs balancing or whether balancing is complete because each battery cell in the group of battery cells has a voltage within the balancing window. In addition, similar to the charging process disclosed above to increase the overall voltage of the group of battery cells, after each charging interval implemented to balance the battery cells in the group of battery cells, the processor may retrieve additional voltage data for each battery cell in the group of battery cells to determine if a different sub-group of battery cells should be charged in a subsequent charging of a sub-group of battery cells of the group to balance the group of battery cells. That is, each time the charging process is repeated to balance the group of battery cells, the same or a different sub-group may be charged depending on the most up-to-date voltage data for the battery cells in the group.

Figure 5:
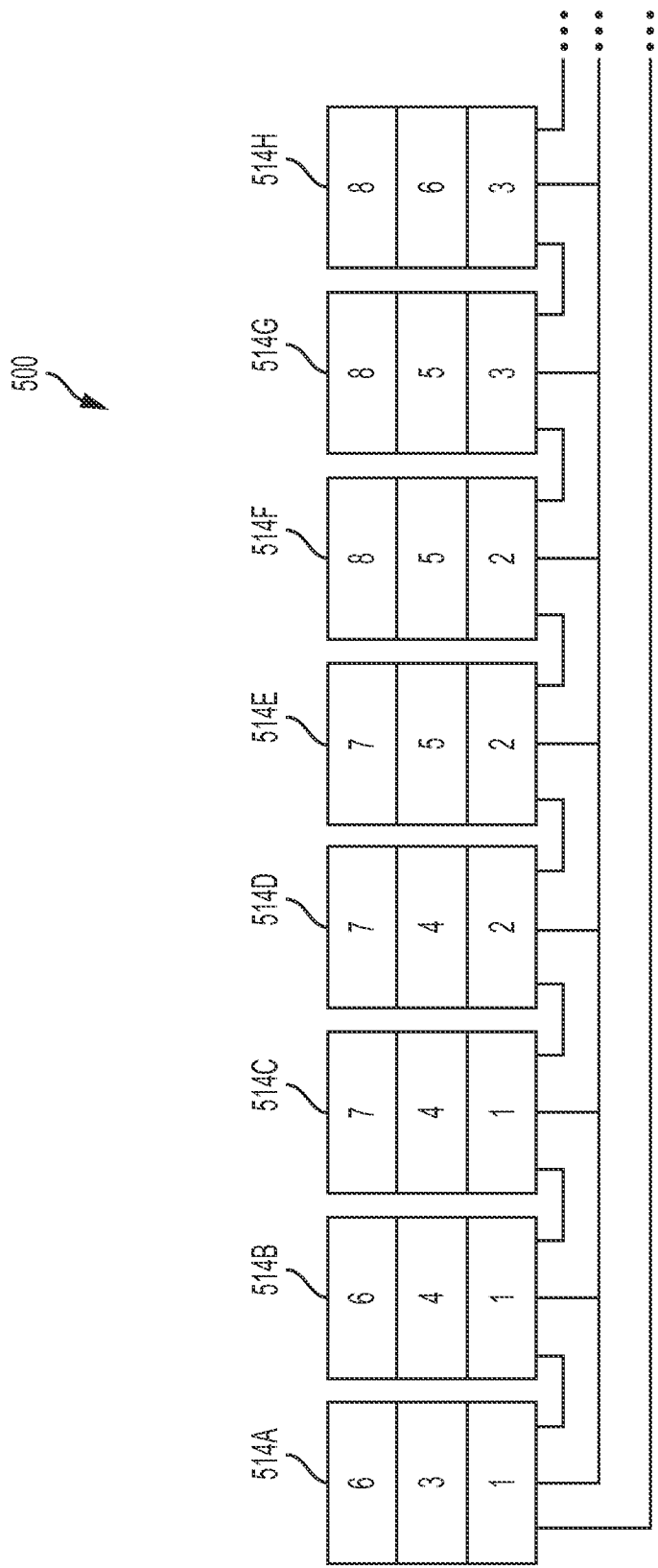
FIG. 5 is a block diagram illustrating a charging and balancing process performed on a group of battery cells to charge and balance a group of battery cells according to an embodiment of the disclosure.

The processor may charge a sub-group of battery cells to increase the overall voltage across the group of battery cells while also balancing the group of battery cells. For example, FIG. 5 illustrates a block diagram illustrating a charging and balancing process performed on a group of battery cells to charge and balance a group of battery cells according to an embodiment of the disclosure. The processor may determine to charge and balance a group of battery cells upon determining that the group of battery cells is in need of charging and in need of balancing. For example, the processor may process information received from each battery cell of a plurality of battery cells. From this information, the processor may determine that a group of battery cells needs charging because the overall voltage across the group of battery cells is below the pre-determined charge voltage threshold value for the group. The processor may also determine that the group needs balancing because one or more battery cells in the group of battery cells has a voltage that is outside the balancing window for the group of battery cells.

One example for balancing the battery cells may include "walking" (also referred to as "skips," "jumps," or "cascades") through the battery cells in selection of groups, sequentially or out-of-order, of three or another number of battery cells to eventually provide full coverage of all battery cells. This example pattern is shown in FIG. 5. In FIG. 5, the group of battery cells 500 consists of eight series-connected battery cells 514A-514H, which may correspond to a one of the groups 112-118 illustrated in FIG. 1. Based on the numerous calculations and determinations disclosed herein that the processor may make based on processing of the information received from each battery cell in a plurality of battery cells including the group 500, the processor may determine that three cells should be charged during each pre-determined charging time interval. Charging and balancing a group of battery cells may include charging a different consecutive sub-group of battery cells in a walking pattern. For example, the first sub-group of battery cells to be charged may be battery cells 514A-514O, the second sub-group of battery cells to be charged are battery cells 514D-514F, the third sub-group of battery cells to be charged are battery cells 514G-514A, the fourth sub-group of battery cells to be charged are battery cells 514B-514D, the fifth sub-group of battery cells to be charged are battery cells 514E-514G, the sixth sub-group of battery cells to be charged are battery cells 514H-514B, the seventh sub-group of battery cells to be charged are battery cells 514C-514E, and the eighth sub-group of battery cells to be charged are battery cells 514F-514H. This sequence is denoted by the three 1's shown for battery cells 514A-C, the three 2's shown for battery cells 514D-514F, and so on. Once a sub-group of battery cells has been charged during a charge interval, the next consecutive sub-group of battery cells may be charged. The process may continue the "walking" pattern for the remaining sub-groups, looping back around to the beginning of the group when the end is reached.

The walking-pattern with loop-back charging process may iteratively continue until the charging iteration total is equal to the amount of battery cells in the group. For example, the charging process terminates after the eighth iteration because there are only eight battery cells in the group 500. Performing the walking-pattern with loop-back charging process until the charging iteration equals the number of battery cells in the group ensures that the final sub-group charged contains the final sub-group in the group, thus ensuring that all battery cells in the group receive the same amount of charge during the charging process. In other words, charging and balancing a group of battery cells may include repeating the steps of selecting a sub-group, reconfiguring the group of battery cells to allow charging, charging the sub-group of battery cells, and reconfiguring the group of battery cells to allow operation. The steps are repeated for a different sub-group of battery cells than the first sub-group of battery cells until each battery cell in the group of battery cells has been charged an equal number of times. In this example, each different sub-group of battery cells may be comprised of the same number of battery cells as the initially-selected sub-group of battery cells. However, different sizes of sub-groups may be employed during the "walking" process. With the balancing process, charging intervals may be shorter than when a charging process for the group is performed independent of a balancing process for the group.

After a group has been charged and/or balanced, the processor may proceed to retrieve additional information from each of the plurality of battery cells to determine whether another group of battery cells requires charging and/or balancing. If a group of battery cells is determined to require charging and/or balancing, the processor may initiate one of the processes described in this disclosure. The process may be repeated continuously to ensure that the plurality of battery cells remain charged and balanced.

Figure 6:
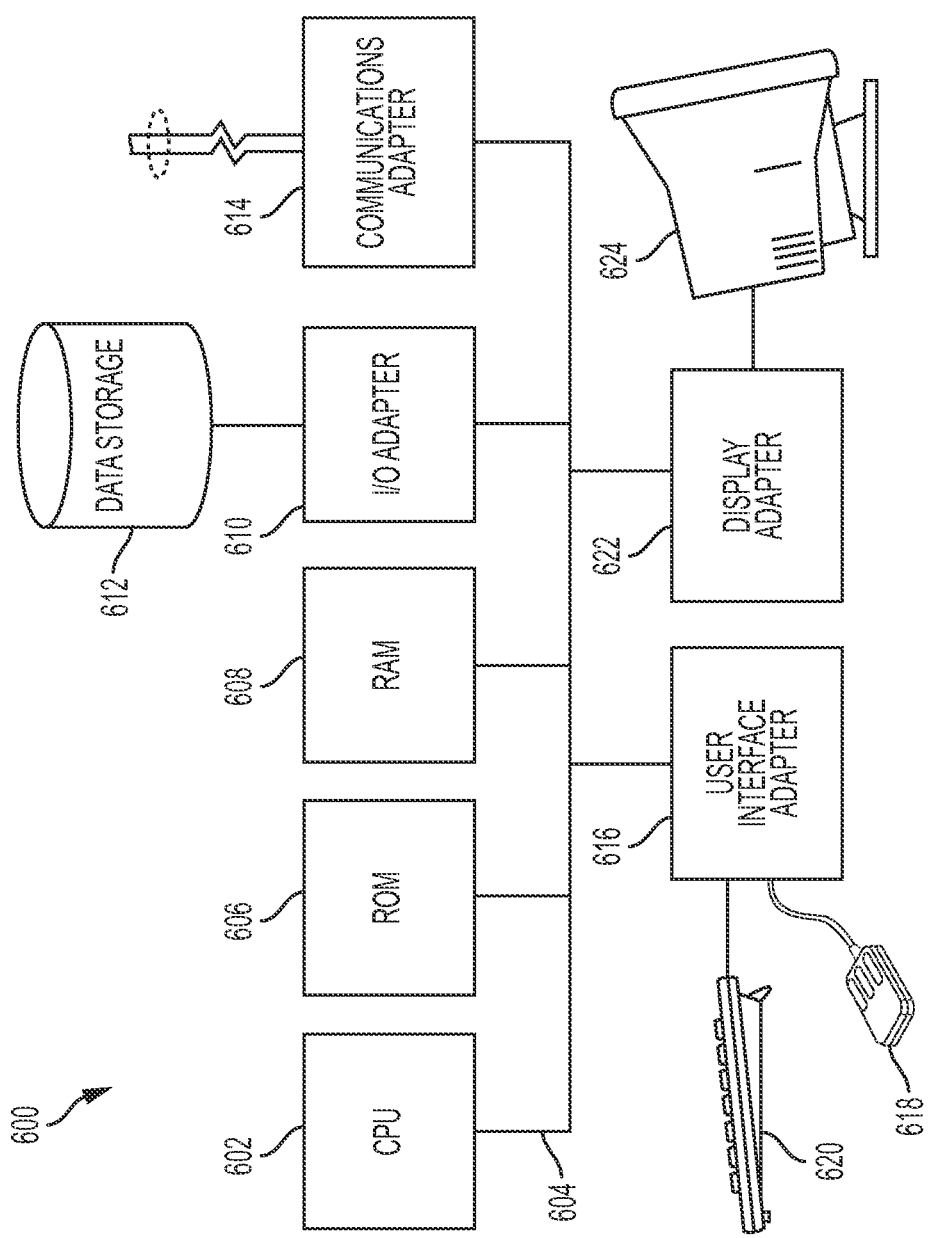
FIG. 6 is a block diagram illustrating a client device for communicating with a battery pack system according to one embodiment of the disclosure.

A client device may communicate with the battery pack systems described above to allow control and monitoring of the systems, even when the systems are operating autonomously. FIG. 6 is a block diagram illustrating a client device for communicating with a battery pack system according to one embodiment of the disclosure. A computer system client device 600 includes a central processing unit (CPU) 602 coupled to a system bus 604. The CPU 602 may be a general purpose CPU or microprocessor, graphics processing unit (GPU), microcontroller, or the like. The present embodiments are not restricted by the architecture of the CPU 602 so long as the CPU 602, whether directly or indirectly, supports the modules and operations as described herein. The CPU 602 may execute the various logical instructions according to the present embodiments. Logical instructions may be stored in the CPU 602, in a battery pack system module (not shown), or in an initializer (not shown).

The computer system 600 may also include random access memory (RAM) 608, which may be, for example, SRAM, DRAM, SDRAM, or the like. The computer system 600 may use RAM 608 to store the various data structures used by a software application having code to electronically monitor and control battery pack system modules. The computer system 600 may also include read only memory (ROM) 606, which may be PROM, EPROM, EEPROM, optical storage, or the like. The ROM may store configuration information for booting the computer system 600. The RAM 608 and the ROM 666 may hold user and system data.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600 in order to input operating parameters for a battery pack system module. In a further embodiment, the display adapter 622 may display a graphical user interface for monitoring and/or controlling battery pack system modules. The display adapter 622 or other user interface device on the bus 604 may include audio outputs and high visibility visual displays for audibly and/or visually alerting a user to battery system status; especially status that requires priority response from a user.

The I/O adapter 610 may connect one or more storage devices 612, such as one or more of a hard drive, a compact disk (CD) drive, a floppy disk drive, and a tape drive, to the computer system 600. The communications adapter 614 may be adapted to couple the computer system 600 to a network, which may be one or more of a LAN, WAN, and/or the Internet. The user interface adapter 616 may couple user input devices, such as a keyboard 620 and a pointing device 618, to the computer system 600. The display adapter 622 may be driven by the CPU 602 to control the display on the display device 624.

The applications of the present disclosure are not limited to the architecture of computer system 600. Rather the computer system 600 is provided as an example of one type of computing device that may be adapted to perform the functions of a client device in communication with a battery pack system or controller coupled to a battery pack system via a communication network. For example, any suitable processor-based device may be utilized including without limitation, personal data assistants (PDAs), tablet computers, smartphones, computer game consoles, or multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

Embodiments of the disclosure exhibit numerous advantages over prior art charging schemes. For example, implementation of charging schemes disclosed herein allows for lower voltage power supplies to be used, resulting in less high voltage stress on battery management system components and less exposure to high voltage charge sources by people and equipment. In addition, inherent redundancy may be provided by allowing charging to be done simultaneously or substantially simultaneously with discharging without interrupting the discharging process. Another advantage may include the allowance of the use of lower cost chargers to the battery system to continuously keep the battery system charged to its optimum state of charge for the application. A further advantage may be that the process can operate with other charge sources that are intermittently available such as wind generators or solar panels. In other words, when energy is available, it can be utilized piecemeal in time to keep a battery system available continuously without interruption. Another advantage may be an increase in system charge current by using the same method and separating the battery system charge ports into multiple charge ports with fewer groups on each port where each port can be charged simultaneously or substantially simultaneously. As a result, a two-charge port system may be charged twice as fast as a single-charge port system.

The schematic flow chart diagram of FIG. 2 is generally set forth as a logical flow chart diagram. As such, the depicted order and labeled steps are indicative of one embodiment of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    selecting a first group of series-connected battery cells for charging from among a plurality of groups of battery cells;
    initially selecting a sub-group of battery cells from the first group of series-connected battery cells for charging separately from other battery cells of the first group of series-connected battery cells;
    reconfiguring the first group of series-connected battery cells to allow charging of the sub-group of battery cells separate from the other battery cells within the first group of series-connected battery cells while at least one of the remaining groups of the plurality of groups of series-connected battery cells is discharging;
    charging the sub-group of battery cells by applying a voltage across the first group of series-connected battery cells while at least one of the remaining groups of the plurality of groups of battery cells is discharging;
    while the sub-group of battery cells is charging, isolating the first group of series-connected battery cells from a common discharge node of the plurality of groups of battery cells using a discharge isolating diode coupled between the first group of series-connected battery cells and the common discharge node to limit a discharge current from the at least one of the remaining groups of the plurality of groups of series-connected battery cells from flowing to the first group of series-connected battery cells;
    reconfiguring the first group of series-connected battery cells to allow discharging of the subgroup of battery cells with the other battery cells; and
    performing a walking-pattern through the first group of series-connected battery cells by repeating the steps of selecting a sub-group, reconfiguring the group of series-connected battery cells to allow charging, charging the sub-group of battery cells, and reconfiguring the group of series-connected battery cells to allow operation, wherein the steps are repeated for a different sub-group of battery cells of the first group of battery cells than the first sub-group of battery cells until each battery cell in the first group of battery cells has been charged a number of times equal to the number of cells in the initially selected sub-group of series-connected battery cells.

2. The method of claim 1, wherein the step of charging the subgroup of battery cells comprises charging the sub-group of battery cells with a charge source having a voltage less than a full charge voltage of the first group of series-connected battery cells.

3. The method of claim 2, wherein, in operation, the full charge voltage of the first group of series-connected battery cells is greater than a second voltage used by the charge source to charge the sub-group of battery cells.

4. The method of claim 1, further comprising:
    selecting a second sub-group of battery cells from the first group of series-connected battery cells for balancing, wherein the second sub-group comprises at least a battery cell having the lowest voltage of any battery cell in the first group of battery cells;
    reconfiguring the first group of series-connected battery cells to allow charging of the second subgroup of battery cells separate from the other series-connected battery cells;
    charging the second sub-group of battery cells; and
    reconfiguring the group of series-connected battery cells to allow discharging of the second subgroup of battery cells with the other series-connected battery cells of the first group.

5. The method of claim 1, wherein the reconfiguring and charging steps are performed automatically without operator intervention.

6. The method of claim 1, wherein the reconfiguring and charging steps are performed without interrupting a power bus coupled to the first group of battery cells.

7. The method of claim 1, wherein the method is performed by a battery management system coupled to the first group of battery cells.

8. The method of claim 1, wherein the method is performed by a control block within one battery cell of the first group of series-connected battery cells.

9. The apparatus of claim 1, wherein the processor is further configured to:
    isolate the lowest capacity group of battery cells from the other parallel-coupled groups of battery cells; and
    couple the power supply to the lowest capacity group.

10. The method of claim 1, wherein reconfiguring the first group of series-connected battery cells to allow charging of the sub-group of battery cells separate from the other battery cells within the first group of series-connected battery cells further includes placing the other battery cells within the first group of series-connected battery cells in a bypass mode.

11. The method of claim 1, wherein each different sub-group of battery cells is comprised of the same number of battery cells as the initially-selected sub-group of battery cells.

12. The method of claim 1, wherein different numbers of battery cells are selected for the sub-groups of battery cells while performing the walking-pattern.

13. An apparatus, comprising:
    a plurality of battery cells comprising a plurality of groups of battery cells coupled in parallel;
    a processor configured to:
    select a sub-group of battery cells from a first group of battery cells for charging separately from other battery cells of the selected first group of battery cells;
    reconfigure the group of battery cells to allow charging of the sub-group of battery cells separate from the other battery cells within the first group of battery cells while at least one of the remaining groups of the plurality of groups of battery cells is discharging; and
    reconfigure the group of battery cells to allow discharging of the subgroup of battery cells with the other battery cells after the sub-group of battery cells have been charged;

a power source configured to charge the sub-group of battery cells by applying a voltage across the first group of series-connected battery cells when the first group of battery cells has been reconfigured to allow charging of the subgroup of battery cells separate from the other battery cells while at least one of the remaining groups of the plurality of groups of battery cells is discharging; and a discharge isolating diode coupled between the first group of battery cells and a common discharge node of the plurality of groups of battery cells to isolate the first group of battery cells from a discharge current from the at least one of the remaining groups of the plurality of groups of battery cells while the sub-group of battery cells is charging by limiting a discharge current from the at least one of the remaining groups of the plurality of groups of battery cells from flowing to the first group of battery cells;

wherein the processor is further configured to:

interrogate each battery cell in the plurality of battery cells to record a relative capacity of each battery cell;

calculate, using the recorded relative capacity of each battery cell, the capacity of each parallel-coupled group of battery cells;

compare capacities of each parallel-coupled group of battery cells to determine a lowest capacity parallel-coupled group and a highest capacity parallel-coupled group; and calculate an amount of charge required to approximately equalize the lowest capacity parallel-coupled group with the highest capacity parallel-coupled group.

14. The apparatus of claim 13, wherein said common discharge node comprises a plurality of coupled discharge nodes, and said apparatus further comprises a plurality of charge nodes coupled to the groups of battery cells, wherein each group of battery cells coupled in parallel is coupled to at least one charge node and at least one discharge node.

15. The apparatus of claim 14, wherein each of the groups of battery cells is further coupled to the at least one discharge node via a separate discharge isolating diode and each of the groups of battery cells is further coupled to the at least one charge node via a separate charge isolating diode.

16. The apparatus of claim 13, wherein the power source has a voltage less than a full charge voltage of the first group of battery cells.

17. The apparatus of claim 16, wherein, in operation, the full charge of voltage of the first group of battery cells is greater than a second voltage used by the power source to charge the sub-group of battery cells.

18. The apparatus of claim 13, wherein the processor is further configured to place the other battery cells within the first group of battery cells in a bypass mode to isolate the sub-group of battery cells for charging.

* * * * *